(12) United States Patent
Lott

(10) Patent No.: US 9,769,993 B1
(45) Date of Patent: Sep. 26, 2017

(54) TREE STABILIZATION SYSTEM, METHOD AND APPARATUS

(71) Applicant: John Lott, Auburndale, FL (US)

(72) Inventor: John Lott, Auburndale, FL (US)

( * ) Notice: Subject to any disclaimer, the term of this patent is extended or adjusted under 35 U.S.C. 154(b) by 0 days.

(21) Appl. No.: 15/378,249

(22) Filed: Dec. 14, 2016

Related U.S. Application Data

(60) Provisional application No. 62/391,250, filed on Apr. 25, 2016, provisional application No. 62/494,872, filed on Aug. 24, 2016.

(51) Int. Cl.
*A01G 17/04* (2006.01)
*A01G 13/00* (2006.01)

(52) U.S. Cl.
CPC .............. *A01G 17/04* (2013.01); *A01G 13/00* (2013.01)

(58) Field of Classification Search
CPC ................................ A01G 17/04; A01G 13/00
USPC ........................................ 47/43; 119/221–222
See application file for complete search history.

(56) References Cited

U.S. PATENT DOCUMENTS

| 4,334,499 | A | * | 6/1982 | Baass | ..................... | A01K 61/70 |
| | | | | | | 119/222 |
| 4,520,590 | A | * | 6/1985 | Schuh | ..................... | A01G 17/04 |
| | | | | | | 47/43 |
| 4,894,950 | A | * | 1/1990 | Yukio | ..................... | A01G 17/04 |
| | | | | | | 47/42 |
| 5,564,369 | A | * | 10/1996 | Barber | ................. | A01K 63/006 |
| | | | | | | 119/221 |
| 5,881,495 | A | | 3/1999 | Clark | | |
| 6,042,300 | A | * | 3/2000 | Walter | ................... | A01K 61/70 |
| | | | | | | 119/221 |
| 6,056,476 | A | * | 5/2000 | Streichenberger | ..... | A01H 13/00 |
| | | | | | | 47/59 R |
| 6,186,702 | B1 | * | 2/2001 | Bartkowski | ............ | A01K 61/70 |
| | | | | | | 119/207 |
| 6,299,125 | B1 | | 10/2001 | Zayeratabat | | |
| 6,389,743 | B1 | * | 5/2002 | Stephenson | ............ | A01G 17/12 |
| | | | | | | 47/43 |
| 8,567,118 | B2 | | 10/2013 | Farmer et al. | | |
| 2009/0031623 | A1 | * | 2/2009 | Decker | .................. | A01G 17/12 |
| | | | | | | 47/43 |
| 2009/0119984 | A1 | * | 5/2009 | Nabhan | .................. | A01G 17/04 |
| | | | | | | 47/43 |
| 2012/0097080 | A1 | * | 4/2012 | Agg | ....................... | A01G 17/04 |
| | | | | | | 47/42 |

(Continued)

FOREIGN PATENT DOCUMENTS

| CN | 203353319 U | 12/2013 |
| CN | 203435480 U | 2/2014 |

(Continued)

*Primary Examiner* — Marc Burgess
(74) *Attorney, Agent, or Firm* — Dunlap Bennett & Ludwig PLLC

(57) ABSTRACT

An underground tree stabilization device used to stabilize a tree in heavy weather. The tree stabilizer includes a cement anchor base that increases the drag through the soil and thus acts as a brake. When attached to the base of a tree, the tree stabilizer can prevent the tree from being toppled. By limiting the rocking motion and installing the cement base below the top soil, the trees natural ability to survive is greatly enhanced. The present invention is intended for mature shallow root trees, using an underground cabling system attached to a large cement base that may be formed with the tree in place.

5 Claims, 4 Drawing Sheets

(56) References Cited

U.S. PATENT DOCUMENTS

| | | | | |
|---|---|---|---|---|
| 2013/0008083 A1* | 1/2013 | Weder | ................... | A01G 5/04 |
| | | | | 47/45 |
| 2013/0139433 A1* | 6/2013 | Pontarolo | .............. | A01G 13/00 |
| | | | | 47/32.6 |
| 2013/0291433 A1* | 11/2013 | Geer | ................. | A01G 13/0237 |
| | | | | 47/32.5 |
| 2016/0044899 A1* | 2/2016 | Bartkowski | ............. | E02B 3/046 |
| | | | | 405/31 |
| 2016/0120138 A1 | 5/2016 | Hummel | | |
| 2016/0165815 A1* | 6/2016 | Agg | ................... | A01G 23/043 |
| | | | | 47/32.5 |

FOREIGN PATENT DOCUMENTS

| | | | |
|---|---|---|---|
| CN | 203942882 U | 11/2014 | |
| CN | 204132089 U | 2/2015 | |
| WO | 2014060737 A1 | 4/2014 | |

* cited by examiner

TREE STABILIZATION SYSTEM, METHOD AND APPARATUS

CROSS-REFERENCE TO RELATED APPLICATION

This application claims the benefit of priority of U.S. provisional patent application No. 62/391,250, filed Apr. 25, 2016, and U.S. provisional patent application No. 62/494,872, filed Aug. 24, 2016, the contents of which are herein incorporated by reference.

BACKGROUND OF THE INVENTION

The present invention relates to tree stabilization systems and apparatus and, more particularly, to subterranean systems for anchoring a tree in the surface of the ground.

When landscaping a site that is prone to high winds torrential rains, it desirable to anchor a transplanted tree to assist in stabilizing the tree in the soil until the root structure has had an opportunity to mature. In instances where the soil does not provide a great deal of stability, such as sandy soils, and sandy loam, particularly in coastal areas, it is also desirable to provide a permanent anchoring of the tree. Permanent anchoring is intended to prevent toppling and malformation of the tree growth as a result of strong winds and ground saturation by significant rain events, whether prevailing winds or those from strong storms, such as hurricanes or tornadoes.

Presently in the art, most tree anchors consist of stakes that are driven into the ground around the periphery of the tree root ball. To provide better vertical and lateral stabilization of a tree, these stakes are driven into the ground at a distance from the tree base. This leaves the tie down cables as unsightly additions to the landscape. The exposed cables also present trip hazards and interfere with other routine landscape maintenance chores, such as grass cutting, weeding, or mulching around the tree base. In addition, the stakes do not provide a sufficient anchoring, particularly after heavy rains, which can soften the soil. Moreover, the the forces developed by the winds acting on the trees are concentrated at the stakes, which may cause them to become dislodged from the soil.

As can be seen, there is a need for an improved tree anchoring system that provides for a closer anchoring around the base of the tree and wider distribution of the forces acting on the anchor points.

SUMMARY OF THE INVENTION

In one aspect of the present invention, a method of anchoring a tree in a soil surface is claimed and disclosed. The method includes forming a cavity in the soil beneath the root structure of the tree; forming a bore in the soil to intersect with the cavity; extending a ground cable through the bore to place a first portion of the ground cable within the cavity and retaining a second portion of the ground cable above the soil surface; and filling the cavity with a Cementous material to form a cast base, wherein the first portion of the ground cable is cast within the cast base. The method may also include attaching the second portion of the ground cable to an anchor in a base of the tree; and forming a loop in the second portion of the ground cable. The method further includes forming a plurality of channels through a trunk of the tree, the channels opening proximal to the loop in the ground cable.

Other aspects of the method include threading a trunk cable having a first free end and a second free end through the plurality of channels; and threading the free ends of the trunk cable through the loop in the ground cable. The free ends of the trunk cable are secured to an offset anchor. The ground cable may then be tightened via the anchor. Then, the trunk cable may be tightened via the offset anchor. Preferred aspects of the method, include inserting a pipe into the bore; and extending the ground cable through the pipe. Preferably the cavity and the bore are formed by hydraulic drilling.

In yet other aspects of the invention, a tree stabilization device includes a cast base occupying a cavity formed subjacent to a root structure of a tree; a plurality of anchor bores extending from a soil surface adjacent to a trunk of the tree and extending into the cavity. A plurality of anchor cables are secured in the cast base and extend through the anchor bores and have a loop end at a point proximal to a trunk of the tree. An eye lag screw is configured to be threaded into the trunk between adjacent trunk bores, wherein the anchor cable is received through an eye of the eye lag screw and the anchor cable is tightened by rotation of the eye lag screw into the trunk. A trunk cable is configured to extend through a plurality of trunk bores extending transversely across a cord line of the trunk, the trunk bores are oriented to extend between adjacent anchor cables. The trunk cable is configured to be threaded through the loop of the anchor cable.

In some embodiments, the tree stabilization device may also include an outer shield received in the anchor bores, wherein the anchor cable is carried within the outer shield. An offset eye lag screw is configured to receive the trunk cable through the offset eye lag screw, wherein the trunk cable is tightened by rotation of the offset eye lag screw. In yet other embodiments, a tubular insert is received in the trunk bores and the trunk cable is threaded through the tubular insert.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an improved tree anchor system, method and apparatus having a broad subterranean base to provide for stability and anchor ties in the base of the tree to eliminate unsightly and interfering cable extensions.

Figure 1:
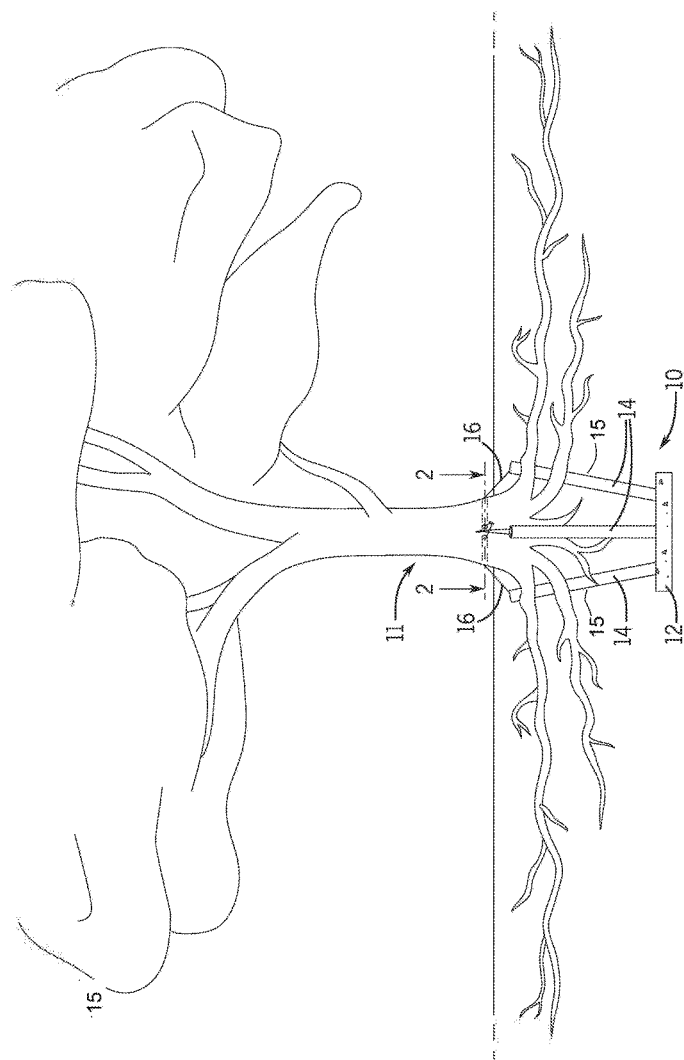
FIG. 1 is a side elevation view of a tree anchor according to an embodiment of invention in use.

As seen in reference to FIG. 1, a tree anchor system 10 according to aspects of the present invention includes a cast base 12, a plurality of tree restraints having an outer shield 14 and an inner anchor cable 16. The cast base 12 is positioned subjacent to the root ball of the tree and the anchor cables 16 and outer shields 14 extend through the cast base and the soil to a position at or above the ground surface. The trunk cables 16' are configured to extend through the trunk 11 of the tree proximal to the ground surface.

Figure 2:
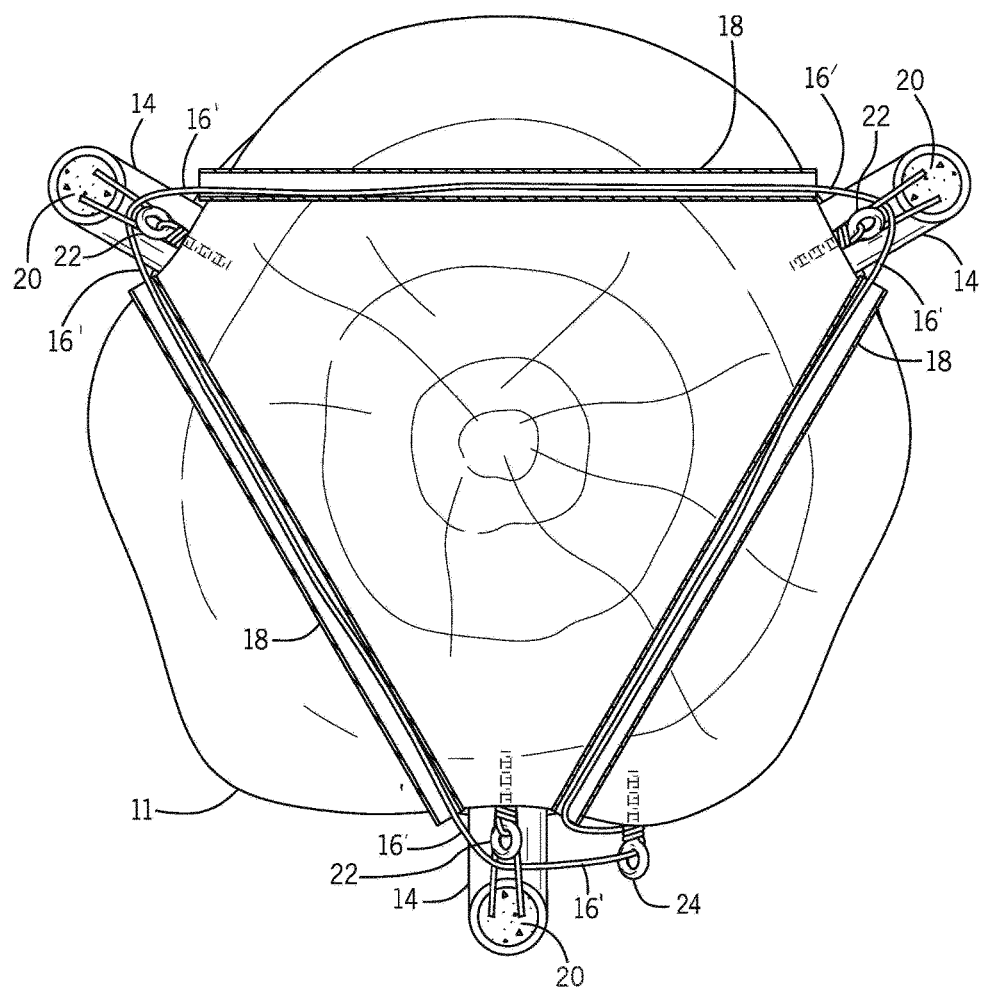
FIG. 2 is a cross-sectional view of the embodiment of the tree anchor taken on line 2-2 of FIG. 1.
Figure 3:
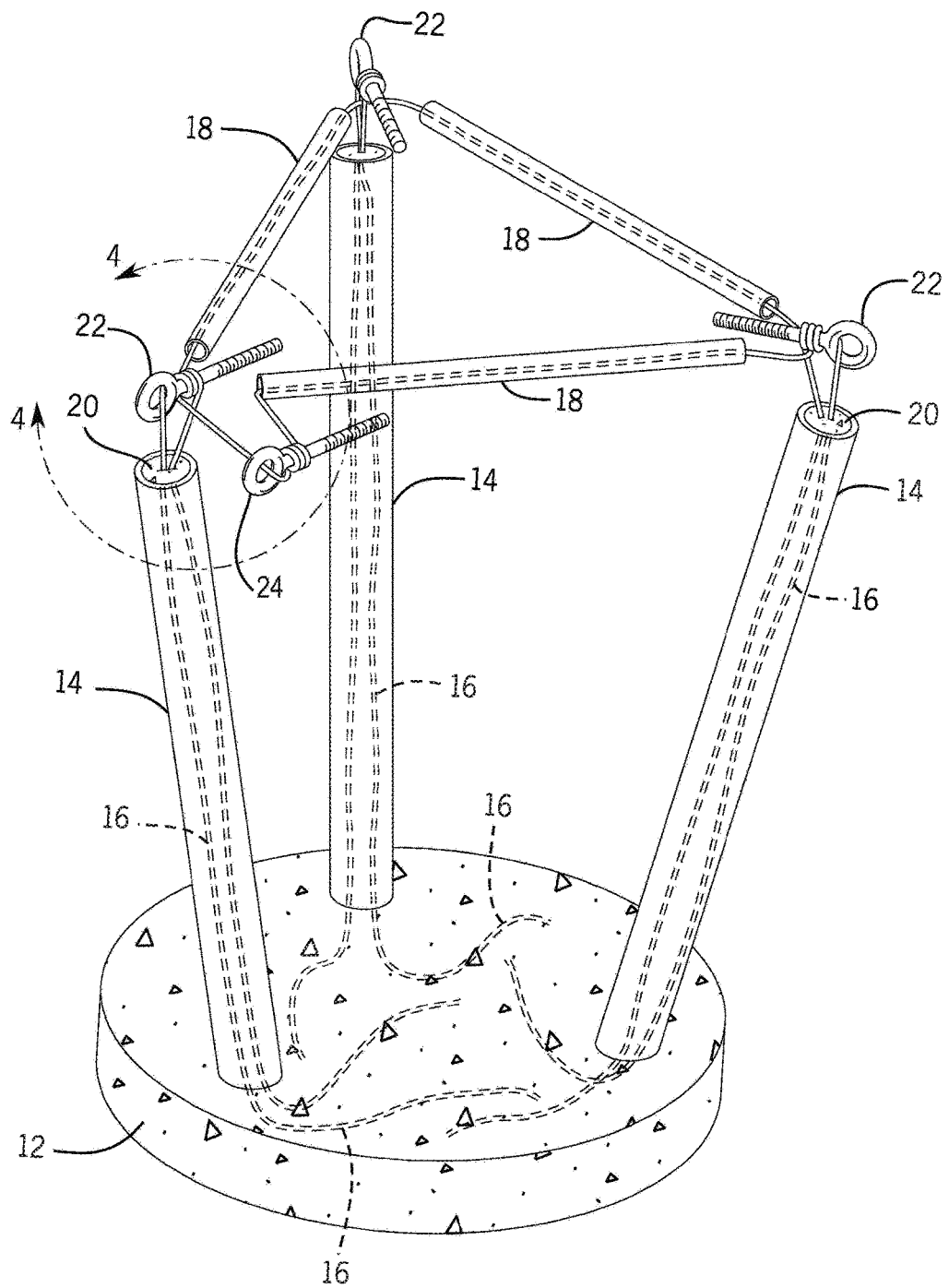
FIG. 3 is a perspective view of the tree anchor, not showing the tree.
Figure 4:
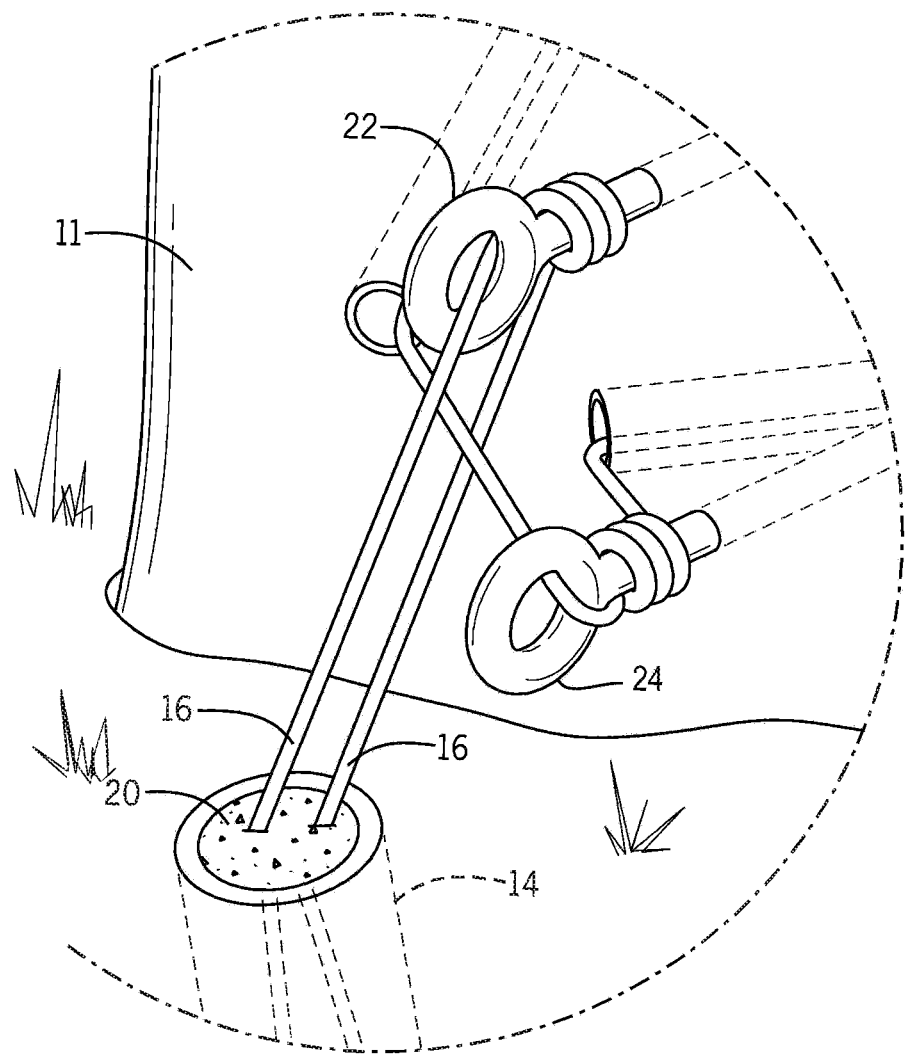
FIG. 4 is a detail perspective view of the tree anchor applied to the tree.

As seen in reference to FIG. 2, the trunk cables 16' are configured to extend through the tree trunk 11 through a plurality of trunk bores 17 formed through the tree trunk 11. In the embodiment shown in FIG. 2, three trunk bores 17 extend through the tree trunk 11 in a generally triangular configuration. The trunk bores 17 have a tubular insert 18 that extends through the bores 17 to a point proximal to the cast base 12.

The stabilizer 10 may be installed with new plantings or may be applied to a mature tree in situ. The stabilizer 10 is designed to be installed in the subsoil directly under the tree. The idea is to place the stabilizer base 12 as deep into the subsoil beneath the root ball or root center as possible.

The installation according to aspects of the present invention is fairly simple. A source of pressurized water is applied to the soil structure around the base of the tree using a hydraulic drilling process to erode the soil and define a plurality of anchor bores 15 extending into the soil and a produce cavity at the intersection of the plurality of anchor bores 15 beneath the tree's root structure.

Preferably a water pump is utilized to create the pressurized water source to wash the dirt/sand from the pipes quickly. The pressure from a garden hose will work, but requires more time. When using a garden hose, it is preferable to use a multi-connector with a ¾" hose outlet to connect two or more hoses to build pressure.

Step 1 Surface Preparation

In a first step, surface preparation is accomplished by removing landscaping from around the base of the tree. Using a pressurized water source, wash the debris and loose soil from the base of the tree to a depth of about 4 inches so as to partially expose the major roots of the tree. When the debris has been removed, the location for the placement of a plurality of anchor bores 15 in the next step can be determined. For most applications, three anchor bores 15 should be sufficient to construct the stabilizer base 12, but there is no maximum number that may be used, depending upon on the size and shape of the in situ tree. All tools and pipes need to be securely fastened. The back and forth motion used for the hydraulic drilling can cause them to work loose and fall off. It is also recommended to leave the water source running until the tool is removed from pipe, to prevent settling sand from locking tool in the hole.

Step 2 Bore and Cavity Formation—Hydraulic Drilling

The plurality of anchor bores 15 are formed by the injection of a pressurized water source through a pipe to flush the soil out of the anchor bore 15. In most applications, a 36" section of 2" PVC pipe is utilized to apply a pressurized source of water to wash a passage for the pipe between the roots. The pipe carrying the pressurized water protects the surrounding roots from being damaged by the pressure washer and later introduction of cement into a cavity that will be formed beneath the root ball. During the hydraulic the pipes should be oriented so that they will be slightly angled toward the base of the tree and converge beneath the tree to intersect and create a cavity beneath the root ball. The larger the tree, the greater the angle.

Most local building codes will require the collection of sediments on the preparation site that is generated by the hydraulic drilling process. To collect & bag sand and soil sediments, place a 2" "T" joint, with a small extension on top of the hydraulic drilling pipe. Attach flexible 2" hose to 2"×4" connector to end of the hose and secure sand bag around connector. This collects and bags the sand as it is washed out of the hole. This keeps the work area clean and by counting the volume of soil displaced and collected in the bags, measures the amount of soil removed. The bagged sand will be replaced with like amount of cement. For particularly sandy soils, a vacuum source, such as a Shop Vac can also be used to remove sand from the bores and form the cavity.

Wash the dirt from the anchor bore 15, while inserting the pipe into the ground until desired depth is reached or rock encountered. Measure the depth of the anchor bore 15 and cut a pipe to fit. Cut a notch 1"×4" on top end of each the pipe 14 to be used proximal to the surface of the ground. The pipes 14 will later be used to place cable 16 into the cavity forming the base 12, which will be captively retained by pouring cement into pipes later. See step #5. The deeper the cavity, the more secure the stabilizer 10 will be, but should be sufficient to extend beneath the primary root structure and root ball.

Repeat the hydraulic drilling procedure until all the anchor bores 15 are formed and their associated pipes 14 are inserted. It should be noted that when a subsequent hydraulic drilling pipe is inserted it will begin to washout the subsoil between it and the previous pipe. When a fluid path is formed between a subsequent anchor bore 15 and a prior anchor bore 15, the water will start back washing up the previous anchor bore pipe. Temporarily capping the prior pipes will restore the water pressure to continue evacuation of soil from the cavity. As the anchor bores 15 and pipes merge a large cavity will be formed.

Continue applying hydraulic water pressure to erode the subsoil in the cavity and until desired size cavity size is achieved, as determined by the volume of soil collected in the sand bags. In most applications, it is recommended to use one 50 lb. bag of cement for each cable 16. A good rule of the thumb is two partially filled sand bags equal 1 bag cement.

Step 3 Tree Trunk Preparation

The tree trunk 11 is prepared by installing a plurality of eye lag screws 22 into the base of the tree trunk 11 proximal to the surface of the ground and the each of the plurality of in ground pipes 14. The trunk 11 is also prepared by drilling a plurality of laterally disposed bores 17 across a cord line of the trunk 11, being careful to avoid drilling into the heart of the tree. By way of non-limiting example, using a ¼" drill, predrill a 6" hole at a 45' angle, directly above each pipe 14. Screw the eye lag screws 22 22 about 3". It is recommended to use a ⅜"×6" eye lag screw.

Using a long ½" drill, drill a passage 17, for the cables 16 above the eye lag screws 22. Insert a ½" OD PVC pipe, cut to length", in passageway 17. This passageway 17 connects the cable 16 to eye lag screws 22. Drilling holes in the tree only effects the small area where the hole is drilled. An eye lag screw 22 when screwed into a tree leaves no space for pests or disease to enter. Sealing the holes around the pipe 18 also leaves no space for pests or disease to enter. The wood grows over and around the eye lag screws 22 and the embedded pipes 18.

Step 4 Ground Cable Insertion

In this step, measure the depth to the bottom of cavity. The length of the cable 16 required is approximately three times the depth of the cavity. This allows the cable to be doubled in length and reach across the cavity. By way of example, for 3 anchor bores 15 that are 10' deep, you need three cables cut into 30' lengths or 90' of cable. Multiply this value by the number of anchor bores 15 and associated pipes 14 and cut a length of cable 16 to this length. Thread one end of the cable 16 through the one of the eye leg screws 22 then even the cable ends out. Repeat until each eye lag screw 22 has a cable looped through it. Place plastic ties along the length of cable to even out any kinks. To pull the cables 16 down pipes 14 and across the cavity, attach a small float/bobber to a strong string. Holding onto one end of the string, drop the bobber into one of the pipes 14. Water pressure may be used to wash the bobber through the cavity and up the adjoining pipe 14. By placing an end cap on the other pipes 14, the flow of water can be directed to the opposite open pipe 14. When the string is pulled the cables 16 are placed. Repeat this procedure until you have all the cables 16 in place. Leave strings in place for now. They will be used again in step #5.

Step 5 Base Casting

To cast the base 12 in the cavity, place the cable 16 and string into the 1"×4" slot cut into the top of the PVC Pipe. Build a funnel on the end of the pipe 14, for example by placing a 2" PVC connector over end of pipe 14. Insert a 12" section of 2" pipe into connector. Place a 2"×4" Connector on the end pipe. Pour cement into each pipe 14 to fill the cavity, then "tug" on the strings. This will pull the cables from the bottom of cavity and encase the cables 16 in the cement base 12.

When filling the cavity with cement it is recommended to mix cement very thin, which makes pouring and infiltration of the cement into the cavity easier. I recommend using Portland cement. Allow the cement to set up/cure for the recommend time. This allows the cement time to cure and the cables 16 to be firmly secured in the cement base 12 before removing the slack in cables 16, which secures the tree.

Step 6 Looping the Eye Lag Screws and Cables

To tie the eye lag screws 22 and cables 16, 16' together, predrill a ¼"×6" starter hole between two of the eye lag screws 22. Start an offset eye lag screw 24 into this hole. The cable 16' should be cut long enough to encircle tree base plus approximately 24". Do not cut cable too short, as it will need to be overlapped in above eye lag screw 22.

Step 7 Tightening Ground Cables

Begin screwing in the eye lag screws 22. As the eye lag screws 22 are screwed in, the looped ground cable 16 from the ground tubes 14 will be tightened and the slack in ground cable 16 will be removed.

Step 8 Installing Trunk Cable

A trunk cable 16' is formed to encircle the tree trunk 11 by running a trunk cable 16' through the drilled passages 17. A free end of the trunk cable 16' is run through the looped ground cables 16 under the eye lag screws 22. Overlap this cable 16' in the offset lag screw 24 installed proximal to an apex of one of the intersecting channels 17. Allow some slack in the trunk cable 16' to permit the trunk cable 16' to twist around the offset eye lag screw 24 as it is screwed into the tree trunk 11, to tension and lock the trunk cable 16' in place. Screw the offset eye lag screw 24 in last.

The trunk cable 16' running through the tree trunk 11 secures the eye lag screws 22 firmly in the tree trunk 11, preventing the eye lag screws 22 from being pulled out and it provides additional strength to the stabilizer 10. This is a very important step as the trunk cable 16' ties the stabilizer together at the base of the tree and the cement ties ground cables 16 together with the stabilizer base 12 underground. Once complete, recover the site with soil and replace landscaping materials to complete the installation.

In use, the tree will grow over the embedded cables 16 and eye bolts 22, 24 and they will become part of the tree. In fact, the stabilizer 10 becomes stronger each year. The stabilizer's 10 life expectancy is 100 years when coated galvanized cable is used. The weakest point in the stabilizer 10 is where the ground cables 16 attach to the tree. This is why the eye lag screws 22 are used to secure the ground cables 16 to the tree. The trunk cable 16' is then threaded through the tree and through the loops in the ground cables 16.

Depending upon the installation, the depth of the stabilizer base 12 may vary. For example, the depth of a shallow root system is 24" to 30". The depth of the top soil and/or subsoil will also determines the depth of the cavity and base 12. In situations where subsurface limestone deposits are encountered, it is recommended to wash all the loose dirt from the limestone, as the cement will adhere well to the clean limestone.

The diameter of the steel cable 16 can vary. For example, ¼" coated steel galvanized cable may be used for the ground cables 16, while the trunk cable 16' may be increased in size to ⅜". The ¼" cable is preferred for the ground cables 16, because a thicker cable 16 may not have sufficient flexibility to be looped into the pipes 14. The ¼" cable is preferably doubled, which increases it's strength.

The size of the ground pipes 14 passing through the roots of trees and into the ground is limited to the space available between the roots. It is recommended that 2" pipe is the minimum size to use as the pipe 14 should be large enough to accommodate the flow of cement through to the cavity.

The number of eye lag screws 22 used will be determined by how many cables are attach to the tree. Galvanized is best for underground applications.

Cement has more tensile strength than concrete and can withstand the strong forces of wind better. It is also easier to mix and pour! Use a minimum of 50 LBS. of cement for each cable.

It should be understood, of course, that the foregoing relates to exemplary embodiments of the invention and that modifications may be made without departing from the spirit and scope of the invention as set forth in the following claims.

What is claimed is:

1. A tree stabilization device, comprising:
    a cementous base configured to occupy a cavity subjacent to a root structure of the tree;
    a plurality of anchor cables having a first end embedded in the cementous base, each of the plurality of anchor cables having a loop at a second end, each of the plurality of anchor cables encased in a cementous material extending from the first end to a point proximal to the loop, the plurality of anchor cables configured to be disposed in a spaced apart relation around a circumference of a trunk of the tree;
    a plurality of eye lag screws, wherein each loop at the second end of each anchor cable is received through an eye of one the plurality eye lag screws; and
    a trunk cable configured to extend through the loop at the second end of each of the plurality of anchor cables.

2. The tree stabilization device of claim 1, further comprising:
    an outer shield surrounding each of the encased plurality of anchor.

3. The tree stabilization device of claim 2, further comprising:

an offset eye lag screw configured to receive the trunk cable through an offset eye lag screw eye, wherein the trunk cable is adapted to be tightened by rotation of the offset eye lag screw.

4. The tree stabilization device of claim 3, wherein:
the trunk cable is configured to be threaded through a plurality of trunk bores extending across a cord line of the tree trunk.

5. The tree stabilization device of claim 4, further comprising:
a tubular insert configured to be received in each of the plurality of trunk bores, wherein the trunk cable is threaded through the tubular insert.

\* \* \* \* \*